Aug. 29, 1967  L. KALUZA  3,337,906
APPARATUS FOR RUFFLING SAUSAGE CASINGS
Filed April 16, 1965  4 Sheets-Sheet 1
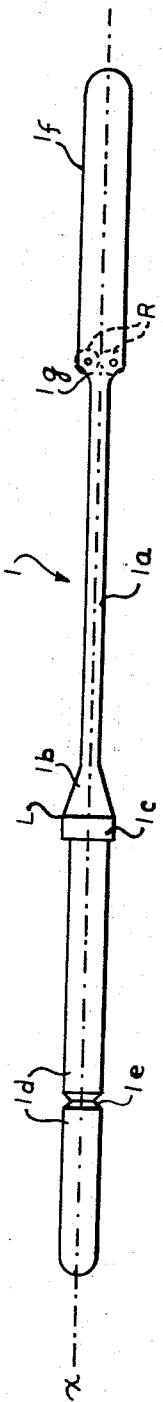
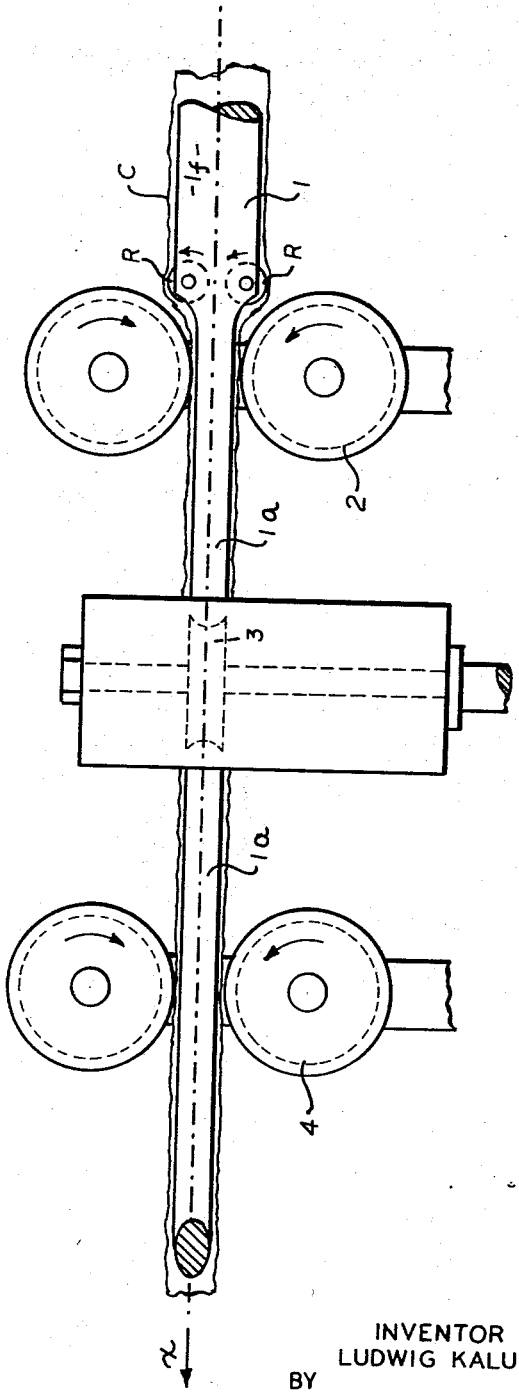
INVENTOR
LUDWIG KALUZA
BY
Burgess, Dinklage & Sprung
ATTORNEYS.

INVENTOR
LUDWIG KALUZA
BY
Burgess, Dinklage + Sprung
ATTORNEYS.

United States Patent Office 3,337,906
Patented Aug. 29, 1967

3,337,906
APPARATUS FOR RUFFLING SAUSAGE CASINGS
Ludwig Kaluza, Weinheim an der Bergstrasse, Germany, assignor to Carl Freudenberg, Weinheim an der Bergstrasse, Germany, a corporation of Germany
Filed Apr. 16, 1965, Ser. No. 448,794
Claims priority, application Germany, Apr. 18, 1964, F 42,658
1 Claim. (Cl. 17—42)

ABSTRACT OF THE DISCLOSURE

An apparatus for producing ruffled or shirred sausage casings in which a free-floating mandrel is inserted into the casing, and the casing is slidably pushed lengthwise over the mandrel and assumes a ruffled configuration as it passes from a constricted intermediate portion of the mandrel onto and over a tapered expansion portion thereof.

---

This invention relates in general to the art of food packaging, and more particularly to an apparatus for ruffling sausage casings and similar food packages.

In recent years, the use of sausage casings made from edible synthetic materials has increased considerably, although natural intestines are still used as sausage casings. Synthetic casings are generally produced by extruding edible plastic materials through annular dies, such as for example, as described in German Patents 682,491, 684,783, 685,523 and 686,891. The extruded synthetic casings thus produced were in the form of continuous tubes and were commonly wound flat onto reels for storage.

However, in the sausage industry it has become increasingly preferable to use shirred or ruffled sausage casings, particularly where synthetic casing are used.

In the prior art, ruffled sausage casings were made by drawing a length of tubular casing onto a mandrel, or onto a paper tube supported by a mandrel, and subjecting the casings thereon to axial compression. This axial compression was achieved by attaching one end of the mandrel to a wall, or other stop means, such as a flange, and feeding the casing over the free end of the mandrel toward the wall, etc., to produce transverse ruffles in the casing by causing successive longitudinal sections thereof to fold accordion-wise against each other, by reason of the restraint provided by the stop means. In this manner a casing of considerable length can be drawn onto and ruffled on a relatively short length of mandrel, or on a short paper tube supported by such a mandrel. For example, in the prior art it was common to fit 10 meters of original unruffled sausage casing onto a sleeve or mandrel 20 cm. long by such a ruffling process.

To date, several variations have been implemented into the aforementioned basic ruffling process, sometimes designated as a pleating, shirring, or crumpling process, and various types of apparatus have been developed for performing such processes.

For example, as shown in U.S. Patent 2,984,574, the sausage casing is drawn over the free end of a tube fastened by a mandrel to a wall or similar equivalent stop means, and three toothed wheels all set 120° from one another are pressed firmly against the sausage casing and rotated at the same speed to continuously push new portions of the casing against the wall. The wall, together with the sleeve and the mandrel supporting it, are made to slowly recede. When the free end of the sleeve has passed through the toothed wheels, the tube with the casing ruffled onto it is removed from the mandrel, and replaced by a fresh, empty tube. The mandrel is then returned to its starting position, the casing is pulled onto the tube, and the ruffling operation is resumed.

U.S. Patent 3,097,393 describes a substantially similar basic ruffling process using a somewhat different apparatus. This patent, like the U.S. Patent 2,984,574, teaches a ruffling operation which is inherently discontinuous, since after a certain length of casing has been ruffled onto the tube, the apparatus has to be stopped in order to put a new sleeve on the mandrel.

According to one proposal of the German Patent 1,072,500, the three toothed wheels used in U.S. Patent No. 2,984,574 are replaced by two toothed wheels.

The German patent specification No. 1,139,049, which has been laid open to public inspection, recommends the ruffling of sausage casings drawn over a tube by means of air suction. To this end, in a manner similar to the process of U.S. Patent 2,984,574, rollers are pressed against the sausage casing drawn onto the tube. In variation of the American process as described by said patent, the rollers do not have any teeth. Instead, a plurality of holes are provided in the roller surface through which air is aspirated by a vacuum applied to the interior of the rolls. The suction thereby produced is intended to produce the formation of pleats in the sausage casing which at first lies smoothly on the tube.

These known processes, in which the ruffling can be performed directly on the mandrel if desired, are all discontinuous in operation. Furthermore, in such processes, to facilitate ruffling, the sausage casings which are first smoothly drawn onto the tube or mandrel must additionally be inflated with air. The various apparatus used for performing such processes are subject to a common disadvantage in that one and the same apparatus can be used to ruffle only one casing diameter size at a given time. If a casing of larger caliber or diameter is to be ruffled, a correspondingly larger tube must be used. This however requires that the rollers or toothed wheels be set further back, since a tube of larger diameter cannot otherwise pass through the existing gap, although the smaller diameter tube might have fitted perfectly in such a gap.

The casing ruffling method according to the instant invention is capable of continuously producing ruffled sausage casings for as long a time as a tubular casing is supplied to its mandrel. Essentially, the method of the invention comprises the steps of internally expanding successive longitudinal sections of the tubular casing to be ruffled, continuously passing said internally expanded casing into an axial compression zone to transversely ruffle successive casing portions therein, and continuously removing said ruffled portions from the axial compression zone. The flow rate of removal of the ruffled casing is maintained in relation to the flow rate of unruffled casing entry into the axial compression zone to produce a ruffled sausage casing having a selected number of ruffles per unit of original unrufflel casing length. As will be readily apparent, the rate of removal of the ruffled casing must necessarily be less than the rate of entry of the unruffled casing, with the difference between those removal and entry rates corresponding to the casing length available for forming ruffles.

The invention advantageously provides an apparatus that does not require any inflation of the sausage casing and which can accommodate more than one casing size within a limited range without the need to change mandrels.

In the apparatus of the invention, the sausage casing ruffling is continuously performed by means including a mandrel inserted into a tubular casing, said mandrel being supported in a substantially fixed manner by guide means which are in engagement with the exterior surface of the casing as it passes longitudinally over the mandrel.

Since during the ruffling operation, the mandrel remains within the casing and is supported fixedly therein without any direct connection through the casing, the ruffling method according to the invention can be maintained indefinitely, and is limited as to time only by the length of unruffled casing supplied to the mandrel.

The mandrel used in the apparatus of the invention is provided with an entrance head portion for internally expanding the casing as it passes onto the mandrel thereat, a constricted intermediate portion adjoining said entrance head portion and connected therewith by a smooth tapered transition section, and a tapered expansion portion adjoining said intermediate portion. This tapered expansion portion is disposed oppositely with respect to the entrance head portion of the mandrel, and serves as an axial compression zone for ruffling the casing.

In the apparatus of the invention, means are provided for slidably pushing the sausage casing relative to the mandrel so that said casing continuously passes over the entrance head, constricted intermediate and expansion portions of said mandrel. As the casing is pushed onto the tapered expansion portion, it is compressed by reason of the outward taper thereof, resulting in successive longitudinal sections of the casing being transversely ruffled as they pass over said expansion portion, with the ruffled casing product being discharged at the termination of said expansion portion. In contrast to the prior art apparatus for ruffling sausage casings, the apparatus of the invention does not use any wall or other stop which would limit the amount of ruffled casing which could be accumulated before interrupting the operation of the apparatus. At the termination of expansion portion, there is nothing to interfere with the passage of the ruffled casing thereover, and thus the axial compression necessary for forming the ruffles is provided by said expansion portion without any interference to the discharge of the ruffled casing product.

The means for passing successive longitudinal sections of sausage casing onto the mandrel for ruffling thereby can be any suitable means conventional in of itself, or even manual means. However, for sanitary purposes, and for reasons which will become apparent in the following detailed description of a preferred embodiment of the apparatus according to the invention, it is preferable to use a pair of counter rotating ruffling wheels for moving the casing over the mandrel and ruffling said casing. These ruffling wheels are oppositely disposed and each has a plurality of gripping teeth for engaging opposite portions of the exterior surface of the sausage casing on the mandrel to urge said casing longitudinally thereover and ruffle successive casing portions passing in engagement with said ruffling wheels.

By arranging the ruffling wheels so that they contact the sausage casing at a longitudinal station on the constricted intermediate portion of the mandrel, and preferably at such a station which is at the beginning of the outwardly tapered expansion portion, the backward axial motion of the mandrel is constrained by reason of the fact that the tapered expansion portion cannot pass through the fixed spacing between the ruffling wheels.

In a similar manner, the axial motion of the mandrel can be constrained in the opposite direction by providing a pair of guides, such as for example, a pair of oppositely disposed guide rollers which engage the exterior surface of the casing which passes over the tapered transition section adjoining the entrance head portion with the constricted intermediate portion of the mandrel.

To restrain the lateral motion of the mandrel, additional pairs of guide rollers, disposed in longitudinally spaced-apart relation to one another are provided, with at least one pair of guide rollers being disposed to contact the casing at points lying on a line perpendicular to the contact point line of the ruffling wheels and/or the other guide roller pairs.

By using a constricted intermediate mandrel portion which is oval rather than circular in transverse cross section, the rotation of the mandrel about its longitudinal axis can be effectively prevented by means of a pair of guide rollers which engage the casing at a longitudinal station on said intermediate portion, said guide rollers having concave sausage casing engagement surfaces which approximately match the convex oval shape of the intermediate portion of the mandrel underlying the casing at the casing contact regions of said guide rollers.

Although it is not essential to extend the mandrel beyond the termination of its tapered expansion portion, it is advantageous to provide a longitudinal extension portion adjoining the termination of said expansion portion, and preferably with a smaller diameter, to aid in guiding the ruffled sausage casing out of the apparatus.

The discharge of the ruffled casing product from the apparatus can be better aided by providing traction guide means, such as for example, toothed, or corrugated endless belts which engage the ruffled casing and urge same over the mandrel extension and out of the apparatus.

Where it is desired to sever the ruffled casing product into sections of predetermined length, a cutting means can be provided, said cutting means being preferably disposed so as to sever the casing at a station along the mandrel extension. In this case, the mandrel extension is preferably provided with an annular peripheral groove at the cutting station so as to permit the use of a cutting device having blades which can be inserted through the casing into the clearance provided by the groove, and then rotated about the longitudinal axis of the extension thereat to completely sever the casing. Such a cutting device can be operated by an automatic control means responsive to the casing ruffling rate so as to perform repeated severing operations at intervals which result in uniform length severed casing sections.

It is therefore, an object of the invention to provide an apparatus for the continuous production of ruffled sausage casings from unruffled tubular casings.

Another object of the invention is to provide an apparatus for ruffling such sausage casings as aforesaid which can be operated automatically.

Other objects and advantages of the invention will become apparent from the following detailed description and accompanying drawings in which:

FIG. 1 is a side view of a mandrel which is used in an apparatus according to a preferred embodiment of the invention.

FIG. 2 is a schematic side view of a portion of the apparatus according to a preferred embodiment of the invention showing typical guide means for supporting and constraining the mandrel of FIG. 1.

Figure 3:
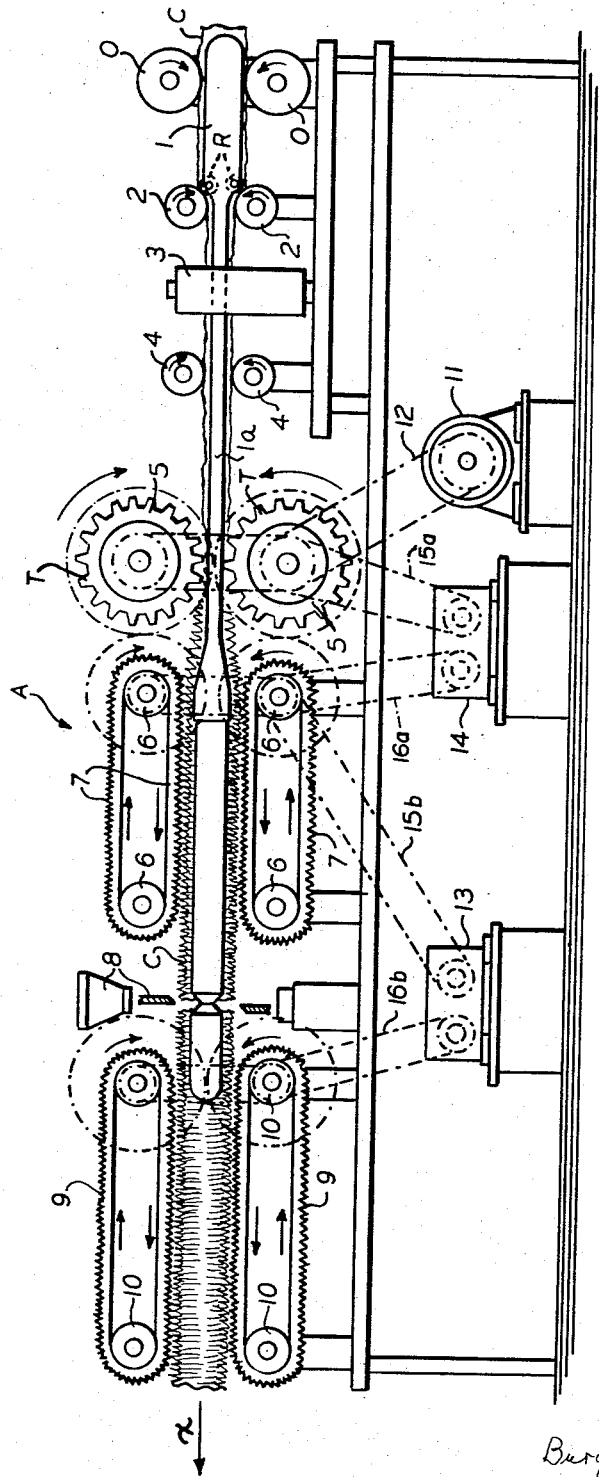
FIG. 3 is a schematic side view of the apparatus shown partially in FIG. 2, taken at a typical operating condition.

Referring now to FIG. 1, the mandrel 1 is constructed with a plurality of longitudinal portions 1a–1g which have respective transverse cross sections so dimensioned and arranged as to permit a tubular sausage casing C (see FIGS. 2–5) to be continuously passed over said mandrel 1 and ruffled thereby, and which permits said mandrel 1 to be supported and substantially constrained against longitudinal and lateral translation movements as well as rotation about its longitudinal axis X and all other transverse axes. The mandrel 1 is provided with an entrance head portion 1f, the free end of which is preferably rounded to facilitate the insertion of said head portion 1f into a tubular casing C, a constricted intermediate portion 1a, which adjoins the entrance head portion 1f and is connected therewith by a smooth transition section 1g, and a tapered expansion portion 1b adjoining said intermediate portion 1a. This expansion portion 1b is actually a transition section joining the intermediate portion 1a, which is preferably oval in cross section, to a cylindrical extension portion 1c of circular cross section.

The ruffling of the sausage casing C is substantially completed upon the arrival of successive ruffled portions thereof at the termination L of the expansion portion 1b and said ruffled casing C is passed over the portion 1c as it is discharged from the apparatus A of the invention.

An additional extension portion 1d is provided adjoining the portion 1c for guiding the ruffled casing C out of the apparatus A. In applications of the invention wherein the ruffled casing C is to be continuously discharged without severing into sections of a given length, the portion 1d can be omitted if desired. Also the portion 1c can be shortened or lengthened as desired.

Although the cross sectional shapes of the various portions 1a–1g of the mandrel 1 can be varied as will be appreciated by the artisan upon reading the detailed description of the apparatus A according to the invention in connection with FIGS. 2–5, the entrance head portion 1f is preferably a circular cylindrical section, as are the extension portions 1c and 1d. the portions 1f and 1c are preferably of the same diameter, with the portion 1d being of somewhat lesser diameter. The intermediate constricted portion 1a, is preferably an oval cylindrical section, having its minor diameter in the plane of FIG. 1 and its major diameter at right angles thereto, as is indicated in FIG. 2. The major diameter of the portion 1a is preferably equal to the diameter of the portion 1f.

To provide a clearance space for the insertion of a severing cutter (see FIGS. 3 and 5) through the ruffled casing C, an annular peripheral groove 1e is provided on the extension portion 1d.

As can readily be seen from FIGS. 2, 3, 4 and 5, the mandrel 1 is supported in a substantially fixed position in the apparatus A as the sausage casing C is passed over it for ruffling. This support is accomplished by guide means in the form of the guide roller pairs 2, 3 and 4, and a pair of oppositely disposed counter rotating ruffling wheels 5, all of which are in rolling contact engagement with the exterior surface of the casing C passing over the mandrel 1 toward the left, as indicated in FIG. 3.

The mandrel 1 support and constrain arrangement provided by the guide rollers 2, 3, 4 and the ruffling wheels 5 is particularly advantageous in that it involves no direct contact with the mandrel 1 through the casing C, and hence is adapted to a continuous feed-through ruffling operation.

With the movement of the casing C being to the left as in FIG. 3 and along the longitudinal axis X of the mandrel 1, the sliding friction of the casing C will ordinarily urge said mandrel 1 in the direction of casing C motion. The longitudinal motion of the mandrel 1 is constrained by the roller pair 2 which are disposed to contact the casing C surface at a longitudinal station on the transition portion 1g of the mandrel 1. Since the space between the oppositely disposed rollers 2 is fixed, the rollers 2 which rotate in a plane containing the minor diameter of the intermediate portion 1a, prevent the mandrel 1 from slipping through under the influence of the sliding casing C.

Actually, the casing contact points of the rollers 2 can be on the intermediate portion 1a with the same result, as is apparent from FIG. 2.

The roller pair 4 is disposed in longitudinal spaced-apart relation to the roller pair 2 for engagement with the casing C at a longitudinal station on the intermediate portion 1a, and said roller pair 4 cooperates with the roller pair 2 to constrain the mandrel 1 against lateral motion and rotation in the plane of rotation of said roller pairs 2 and 4.

The roller pair 3 is disposed in longitudinal spaced-apart relation to the roller pairs 2 and 4 and said rollers 3 rotate in a plane perpendicular to the rotation plane of the roller pairs 2 and 4 and about individual parallel axes perpendicular to their rotation plane.

The rollers 2, 3 and 4 are preferably constructed so as to have a concave casing C peripheral portion which approximately matches the convex shape of the mandrel portion underlying the casing C at their respective casing contact regions. This is particularly advantageous with regard to the roller pair 3 since, with a matching concave casing engagement periphery, the rotation of the mandrel 1 about its longitudinal axis X can be effectively constrained, because of the oval configuration of the intermediate portion 1a. In the case of guide rollers which engage the casing C at longitudinal stations on a circular cross section mandrel 1 portion, the provision of concaved rollers will provide a better gripping and guiding of the casing C over the mandrel 1, although in the case of such circular mandrel 1 portions, concave rollers will not prevent axial rotation of the mandrel 1.

Figure 4:
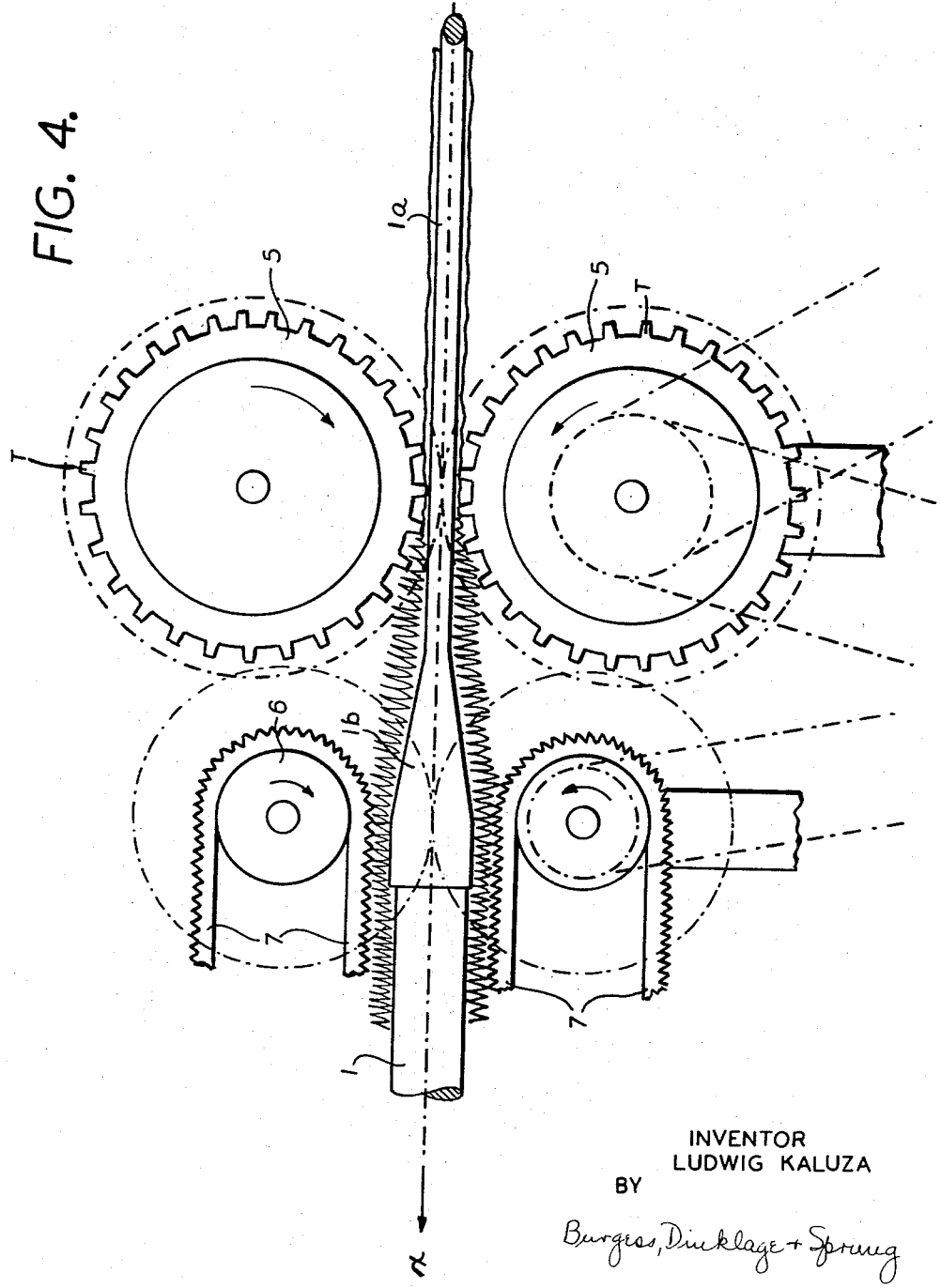
FIG. 4 is a schematic detail view of a portion of the apparatus of FIG. 3.
Figure 5:
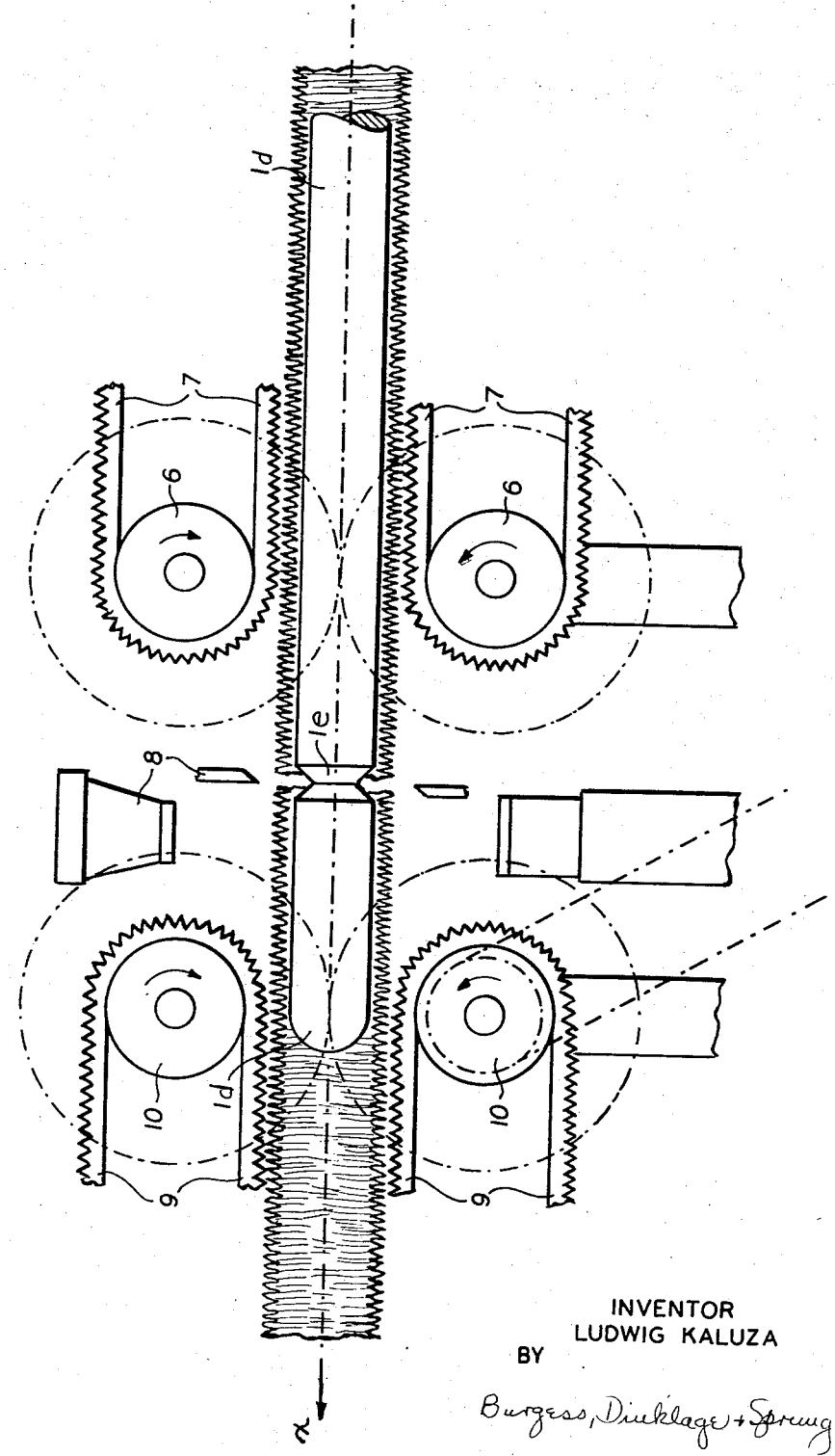
FIG. 5 is a schematic detail view of another portion of the apparatus of FIG. 3.

As can be seen from FIGS. 3 and 4, the counter rotating ruffling wheels 5 are each provided with a plurality of gripping teeth T which engage opposite portions of the exterior surface of the sausage casing C on the mandrel 1 and urge said casing C longitudinally over the mandrel in a continuous manner, and serve together with the expansion portion 1b for ruffling successive casing portions as they pass in engagement with said ruffling wheels 5. The ruffling wheels are disposed to contact the casing C at a longitudinal station on the constricted intermediate portion 1a of the mandrel 1, which is ahead of the expansion portion 1b thereof. As the casing C passes between the ruffling wheels 5 which push it onto the expansion portion 1b, transverse ruffling of the casing C results, because in going along the expansion portion 1b from the end of the intermediate portion 1a to the circular terminus L, the minor diameter of the mandrel along the portion 1b increases, thereby causing a piling up of successive longitudinal sections of the casing C. The somewhat conical expanding portion 1b provides an axial compression zone for the formation of ruffles in the casing C, and has an analogous effect upon the casing C as the wall stop or flange stop used in the prior art apparatus. When the gripping teeth T of the ruffling wheels 5 continue to push out more of the sausage casing C, the accordion-like ruffling or pleating becomes intensified, while the casing C travels on towards the portion 1c and thereover on along the extension portion 1d, where it is gripped by traction drive means in the form of rippling conveyor belts 7 which are driven by rotating rolls 6. The action of the traction belts 7 which engage the ruffled casing C product is such that practically no further ruffling takes place as the belts 7 aid the discharge of the ruffled casing C from the mandrel 1.

Where it is desired to sever the ruffled casing C into lengthwise sections, such as for convenience in subsequent processing operations a cutting device 8 positioned to cut the casing C directly over the groove 1e can be provided. In a typical cutting device 8, such as is shown schematically in FIG. 5, a pair of oppositely disposed blades B are arranged to be driven radially inward through the casing C into the clearance space and rotated around the longitudinal axis X of the mandrel to completely sever the casing C thereat. The cutting drive 8 can be operated by control means (not shown) responsive to the motion of the casing C and/or the ruffle production rate can be provided for severing the ruffled casing C into sections of a selected uniform length.

Where such a severing device 8 is provided, it is preferable to provide an additional set of traction belts 9 driven by rolls 10 similar to the belt 7 and roll drive arrangement used for advancing the ruffled casing to the cutting device 8.

As is shown schematically in FIG. 3, the ruffling wheels 5 can be counter rotatably driven by any suitable conventional means such as a motor 11 and belt 12 transmission. The belts 7 can be conveniently driven by rotary power taken from the wheels 5 and passed to a transmission 14 by a belt 15a, with the rotary power output of transmission 14 being delivered by a belt 16a to rolls 6 for driving belts 7. Similarly, rotary power can be taken from rolls 6 and applied to another transmission by means of a belt 15b and delivered from transmission 13 to rolls 10 by a belt 16b in order to drive belts 9. Any other suitable conventional driving arrangement (not shown) can of source be substituted.

If desired, an additional pair of counter rotatable guide rollers O can be provided to facilitate the longitudinal guidance of the casing C inserted over the entrance head portion 1f of the mandrel 1.

Also if desired, a pair of oppositely disposed rollers R recessed into the tapered transition portion 1g of the mandrel 1 can be provided for rolling contact engagement with the inner surface of the sausage casing C passing thereover, in order to reduce the frictional resistance to the passage of said casing C over the portion 1g. The position of the rollers 2 can be varied as desired in relation to the recessed rollers R so as to cause said rollers 2 and R to engage the casing C along comon lines of contact, or the rollers 2 and R can be spaced apart so as to operate independently.

The roller pairs O, R, 2, 3, and 4 are preferably idler rollers, i.e., not driven, since they serve merely for the guidance of the casing C and the constraint of the mandrel 1. The motion of the casing across the mandrel is effected by the ruffling wheels 5 which are driven wheels and the motion of the ruffled casing C off of the mandrel 1 is aided by the driven belts 7 and 9.

It should be noted that, while the mandrel 1 will be normally urged toward the left as in FIG. 3 by the motion of the casing thereover, the ruffling wheels 5 prevent the escape of said mandrel in the backward direction along its longitudinal axis X.

It should be noted, and as will be appreciated by those skilled in the art, that it is not absolutely necessary according to the invention to use a mandrel 1 wherein the various portions 1a–1g are arranged symmetrically about the longitudinal axis X in a straight line.

What is claimed is:

An apparatus for the continuous production of ruffled sausage casings which comprises:
 (a) a mandrel disposed for free-floating insertion into a tubular sausage casing to be ruffled, said mandrel having an entrance head portion, a constricted intermediate portion adjoining said entrance head portion, and a tapered expansion portion adjoining said intermediate constricted portion; and
 (b) means for slidably pushing the sausage casing to be ruffled relative to said mandrel inserted therein and continuously passing said casing over the entrance head, constricted intermediate, and tapered expansion portions of said mandrel to continuously ruffle successive longitudinal portions of said casing passing from said constricted intermediate portion to and over said tapered expansion portion, with the ruffled casing product being discharged at the termination of the expansion portion of the mandrel.

References Cited

UNITED STATES PATENTS

| 2,646,592 | 7/1953 | Kennedy | 17—42 |
| 3,097,393 | 7/1963 | Matecki | 17—45 |
| 3,110,058 | 11/1963 | Marbach | 17—42 |

FOREIGN PATENTS 598,768　2/1948　Great Britain.

LUCIE H. LAUDENSLAGER, *Primary Examiner.*